United States Patent
Liu et al.

(10) Patent No.: US 11,748,886 B2
(45) Date of Patent: Sep. 5, 2023

(54) CLASSIFYING A LESION BASED ON LONGITUDINAL STUDIES

(71) Applicant: Siemens Healthcare GmbH, Erlangen (DE)

(72) Inventors: Siqi Liu, Princeton, NJ (US); Yuemeng Li, Philadelphia, PA (US); Arnaud Arindra Adiyoso, Nuremberg (DE); Bogdan Georgescu, Princeton, NJ (US); Sasa Grbic, Plainsboro, NJ (US); Ziming Qiu, Brooklyn, NY (US); Zhengyang Shen, Chapel Hill, NC (US)

(73) Assignee: SIEMENS HEALTHCARE GMBH, Erlangen (DE)

( * ) Notice: Subject to any disclaimer, the term of this patent is extended or adjusted under 35 U.S.C. 154(b) by 304 days.

(21) Appl. No.: 17/228,813

(22) Filed: Apr. 13, 2021

(65) Prior Publication Data
US 2021/0334970 A1 Oct. 28, 2021

(30) Foreign Application Priority Data
Apr. 23, 2020 (EP) .................................... 20171081

(51) Int. Cl.
*G06K 9/00* (2022.01)
*G06T 7/00* (2017.01)
(Continued)

(52) U.S. Cl.
CPC .......... *G06T 7/0016* (2013.01); *G06T 7/0014* (2013.01); *G06T 7/62* (2017.01);
(Continued)

(58) Field of Classification Search
CPC . G06T 2207/30096; G06T 2207/30064; G06T 2207/30032; G06T 7/0014;
(Continued)

(56) References Cited

U.S. PATENT DOCUMENTS

2018/0033144 A1* 2/2018 Risman ................ G06T 7/0014
2019/0130578 A1* 5/2019 Gulsun ................. G06N 3/045
(Continued)

FOREIGN PATENT DOCUMENTS

WO WO 2019245597 A1 12/2019

OTHER PUBLICATIONS

Vivanti Refael et al: "Automatie Liver Tumor Segmentation in Follow-Up CT Scans: Preliminary Method and Results"; Jan. 8, 2016: Big Data Analytics in the Social and Ubiquitous Context: 5th International Workshop On Modeling Social Media; MSM 2014; 5th International Workshop On Mining Ubiquitous and Social Environments; Muse 2014 And First International Workshop On Machine LE; XP047332976; ISBN: 978-3-642-17318-9.
(Continued)

*Primary Examiner* — Atiba O Fitzpatrick
(74) *Attorney, Agent, or Firm* — Harness, Dickey & Pierce, P.L.C.

(57) ABSTRACT

A computer-implemented method is for classifying a lesion. In an embodiment, the method includes receiving a first medical image of an examination volume, the first medical image corresponding to a first examination time; receiving a second medical image of the examination volume, the second medical image corresponding to a second examination time, different from the first examination time; determining a first lesion area corresponding to a lesion within the first medical image; determining a registration function based on a comparison of the first medical image and the second medical image; determining a second lesion area within the second medical image based on the registration function and the first lesion area; and classifying the lesion within the first medical image based on the second lesion area. A computer-implemented method for providing a trained classification function, a classification system, and
(Continued)

computer program products and computer-readable media are also disclosed.

14 Claims, 6 Drawing Sheets

(51) Int. Cl.
*G06T 7/62* (2017.01)
*G06V 10/25* (2022.01)
*G06V 10/82* (2022.01)
*G06V 10/44* (2022.01)

(52) U.S. Cl.
CPC ............ *G06V 10/25* (2022.01); *G06V 10/454* (2022.01); *G06V 10/82* (2022.01); *G06T 2207/10116* (2013.01); *G06T 2207/20081* (2013.01); *G06T 2207/20084* (2013.01); *G06T 2207/30096* (2013.01)

(58) Field of Classification Search
CPC .. G06T 7/174; G06T 7/74; G06T 7/30; G06T 7/32; G06T 7/33; G06T 7/38; G06T 2207/10116; G06T 2207/10081; G06T 2207/30061; G06T 7/11; G06T 2207/20081; G06T 2207/20084; G06T 7/0012–0016; G06T 2207/10064–10136; G06T 2207/30004–30104; G06V 2201/032; G06V 10/759; G06V 30/19013; G06V 2201/031; G06V 10/25; G06V 10/70; G06V 10/82; G06V 10/774–7796; G06V 2201/03–034; G06N 3/044; G06N 3/0442; G06N 3/02–126; G06N 20/00–20; A61B 2090/364; A61B 6/032; G06K 9/6256; G06K 9/6257; G06K 9/6259
See application file for complete search history.

(56) References Cited

U.S. PATENT DOCUMENTS

2019/0163949 A1* 5/2019 Park ..................... G06V 10/82
2019/0295709 A1 9/2019 Chabin et al.
2019/0392243 A1* 12/2019 Dufort .................. G16H 50/20
2021/0082107 A1 3/2021 Liu et al.
2021/0085397 A1* 3/2021 Passerini ............... G16H 50/20
2021/0327068 A1* 10/2021 Joskowicz ............... G06T 7/11
2021/0393109 A1* 12/2021 Iketani .................. A61B 1/045

OTHER PUBLICATIONS

Yang, Jie et al: "Class-Aware Adversarial Lung Nodule Synthesis in CT Images"; 2019 IEEE 16th International Symposium On Biomedical Imaging (ISBI 2019); IEEE; Apr. 8, 2019; pp. 1348-1352; XP033576624; DOI: 10.1109/ISBI.2019.8759493ISBI; URL: https://arxiv.org/pdf/1812.11204.pdf.
Heng, Pheng-Ann et al.: "MTMR-Net: Multi-task Deep Learning with Margin Ranking Loss for Lung Nodule Analysis." Deep Learning in Medical Image Analysis and Multimodal Learning for Clinical Decision Support: 4th International Workshop, DLMIA 2018, and 8th International Workshop, ML-CDS 2018, Held in Conjunction with MICCAI 2018, Granada, Spain, Sep. 20, 2018, Proceedings. vol. 11045. Springer, 2018.
Shen, Zhengyang et al. "Networks for Joint Affine and Non-parametric Image Registration", 2019, pp. 4219-4228, DOI: 10.1109/CVPR.2019.00435.
Altaf Fouzia et al: "Going Deep in Medical Image Analysis: Concepts, Methods, Challenges, and Future Directions"; IEEE Access; vol. 7; Jul. 16, 2019; pp. 99540-99572; XP011737991; DOI: 10.1109/ACCESS.2019.2929365.
Xingjian, S. H. I., et al. "Convolutional LSTM network: A machine learning approach for precipitation nowcasting." Advances in neural information processing systems. 2015.
Chen, Sihong, et al.: "Automatic scoring of multiple semantic attributes with multi-task feature leverage: A study on pulmonary nodules in CT images.", IEEE transactions on medical imaging 36.3, pp. 802-814, 2016.
Ren, Shaoqing, et al. "Faster R-CNN: Towards real-time object detection with region proposal networks." Advances in neural information processing systems. 2015.; 2015.
Xie, Yutong, et al.: "Fusing texture, shape and deep model-learned information at decision level for automated classification of lung nodules on chest CT.", Information Fusion 42, p. 102-110, 2018.
Extended European Search Report dated Sep. 29, 2020.
Notification under Rule 71(3) dated Feb. 9, 2023.
European Office Action dated Feb. 23, 2022.

* cited by examiner

CLASSIFYING A LESION BASED ON LONGITUDINAL STUDIES

PRIORITY STATEMENT

The present application hereby claims priority under 35 U.S.C. § 119 to European patent application number EP 20171081.1 filed Apr. 23, 2020, the entire contents of which are hereby incorporated herein by reference.

FIELD

Example embodiments of the invention generally relate to a method and apparatus for classifying a lesion.

BACKGROUND

Patients with certain risk factors should undergo regular screening tests. For example, for heavy smokers between 55 and 80 years a low-dose computed tomography (an acronym is "CT") based lung cancer screening is recommended.

Based on the findings, typically lung nodules between 6 mm to 30 mm, detected in each screening, follow-up screening tests (also denoted as "longitudinal studies") are scheduled to confirm the malignancy predictions before patients are being sent to pathologic evaluation. Due to the small size of lung nodules, detecting lung nodules manually by radiologists is a time-consuming task. Besides the difficulty of detecting nodules in a single CT scan, it is also challenging for radiologists to track and compare multiple nodules between longitudinal CT scans to grade the malignancy of lung nodules. Though there are different guidelines for guiding radiologists to make decisions for scheduling future follow-ups as well as calling patients for pathology test, such decisions remain highly subjective.

From the paper Yang, Jie et al. "Class-Aware Adversarial Lung Nodule Synthesis in CT Images." ISBI 2019, IEEE, 2019 it is known to handle the nodule malignancy grading as a 3D image patch classification problem. The nodules candidates are detected either by radiologists or computer-aided diagnosis systems. 3D image patches centered at these candidates are extracted from the CT images and sent to a deep convolutional neural network-based classifier. The malignancy probability of each nodule is then used for deriving the diagnostic decisions. Some related methods also use the feature extracted with image processing-based techniques to compensate neural networks. In alternative methods, it is proposed to train auxiliary tasks, such as nodule type classification, jointly with the malignancy classification task to marginally improve the accuracy.

SUMMARY

Though the differential information between the longitudinal studies is the major source of evidences that radiologists use for decision making, the inventors have discovered that these previous works are not capable of using such information.

At least one embodiment of the present invention is directed to improving upon the diagnosis and characterization of lesions in longitudinal medical images. The problem is improved upon or even solved by a method for classifying a lesion, a method for providing a trained classification function, a classification system, a medical imaging, a computer-program product and a computer-readable. Advantageous embodiments are described within the claims and within the following description.

In the following, embodiments according to the invention are described with respect to systems as well as with respect to methods. Features, advantages or alternative embodiments herein can be assigned to the other corresponding objects and vice versa. In other words, the systems can be improved with features described or claimed in the context of the corresponding method. In this case, the functional features of the methods are embodied by objective units of the systems.

Furthermore, at least one embodiment according to the invention is described with respect to methods and systems for providing a medical data record, with respect to methods and systems for classifying a lesion, and with respect to methods and systems for providing a trained classifying function. Features, advantages or alternative embodiments herein can be assigned to the other corresponding claimed objects and vice versa. In other words, features of the methods and systems for classifying a lesion can be improved with features described or claimed in the context of methods and systems for providing a trained classifying function. In particular, the trained classifying function provided by a method or a system for providing the trained classifying function can be used within a method or a system for classifying a lesion.

According to a first embodiment, the invention relates to a computer-implemented method for classifying a lesion, comprising receiving a first medical image of an examination volume, wherein the first medical image corresponds to a first examination time, furthermore comprising receiving a second medical image of the examination volume, wherein the second medical image corresponds to a second examination time being different from the first examination time, furthermore comprising determining a first lesion area corresponding to the lesion within the first medical image, furthermore comprising determining a registration function based on a comparison of the first medical image and the second medical image, determining a second lesion area within the second medical image based on the registration function and the first lesion area, and furthermore comprising classifying the lesion within the first medical image based on the second lesion area.

According to a second embodiment, the invention relates to a computer-implemented method for providing a trained classifying function. The method is based on receiving a first medical training image of a training examination volume, wherein the first medical training image corresponds to a first examination time, and on receiving a second medical training image of the training examination volume, wherein the second medical training image corresponds to a second examination time being different from the first examination time. Furthermore, the method is based on determining a registration function based on a comparison of the first medical training image and the second medical training image. Furthermore, the method is based on determining a first lesion area corresponding to a lesion within the first medical training image. Furthermore, the method is based on receiving a training classification corresponding to a first lesion area within the first medical training image. Furthermore, the method is based on determining a second lesion area within the second medical training image based on the registration function and the first medical training image. Furthermore, the method is based on applying a trained classifying function to first training input data and second training input data, thereby generating training output data, wherein the first training input data is based on the first lesion area, and wherein the second training input data (TID.2) is based on the second lesion area (LA.2). Furthermore, the method is based on adjusting at least one parameter of the trained classifying function based on a comparison of the training classification and the output data. Furthermore, the method is based on providing the trained classifying function.

According to a third embodiment, the invention relates to a classification system comprising an interface configured for receiving a first medical image of an examination volume, wherein the first medical image corresponds to a first examination time,
furthermore configured for receiving a second medical image of the examination volume, wherein the second medical image corresponds to a second examination time being different from the first examination time; and
a computation unit configured for determining a first lesion area corresponding to the lesion within the first medical image;
furthermore configured for determining a registration function based on a comparison of the first medical image and the second medical image;
furthermore configured for determining a second lesion area within the second medical image based on the registration function and the first lesion area;
furthermore configured for classifying the lesion within the first medical image based on the second lesion area.

According to a fourth embodiment, the invention relates to a medical imaging system, comprising a classification system to the invention and its aspects. In particular, the medical imaging system can be an X-ray based medical imaging system, e.g. a computed tomography system or a fluoroscopy system.

According to a fifth embodiment, the invention relates to a providing system comprising an interface and a calculation unit:

wherein the interface is configured for receiving a first medical training image of a training examination volume, wherein the first medical training image corresponds to a first examination time,
wherein the interface is furthermore configured for receiving a second medical training image of the training examination volume, wherein the second medical training image corresponds to a second examination time being different from the first examination time,
wherein the calculation unit is configured for determining a registration function based on a comparison of the first medical training image and the second medical training image,
wherein the calculation unit is furthermore configured for receiving a training classification corresponding to a first lesion area within the first medical training image,
wherein the calculation unit is furthermore configured for determining a second lesion area within the second medical training image based on the registration function and the first medical training image,
wherein the calculation unit is furthermore configured for applying a trained classifying function to first training input data and second training input data, thereby generating training output data, wherein the first training input data is based on the first lesion area, wherein the second training input data is based on the second lesion area,
wherein the calculation unit is furthermore configured for adjusting at least one parameter of the trained classifying function based on a comparison of the training classification and the output data,
wherein the interface is furthermore configured for providing the trained classifying function (TCF).

According to a sixth embodiment, the invention relates to a computer program comprising instructions which, when the program is executed by a classification system, cause the classification system to carry out the method for classifying a lesion according to an embodiment of the invention and its aspects.

According to a possible seventh embodiment, the invention relates to a computer program comprising instructions which, when the program is executed by a providing system, cause the providing system to carry out the method for providing a trained classification function according to an embodiment of the invention and its aspects.

According to an eighth embodiment, the invention relates to a computer-readable medium comprising instructions which, when executed by a classification system, cause the classification system to carry out the method for classifying a lesion according to an embodiment of the invention and its aspects.

According to a possible ninth embodiment, the invention relates to a computer-readable medium comprising instructions which, when executed by a providing system, cause the providing system to carry out the method for providing a trained classification function according to an embodiment of the invention and its aspects.

According to a tenth embodiment, the invention relates to a computer-readable storage medium, comprising a trained classifying function provided by a method for providing a trained classifying function according to an embodiment of the invention and its aspects, for use in a method for classifying a lesion.

According to a possible eleventh embodiment, the invention relates to a computer-readable storage medium, comprising a trained classifying function provided by a method for providing a trained classifying function according to an embodiment of the invention and its aspects.

According to a possible twelfth embodiment, the invention relates to a method of using a computer-readable storage medium, comprising a trained classifying function provided by a method for providing a trained classifying function according to an embodiment of the invention and its aspects, for classifying a lesion.

According to an embodiment, the invention relates to a computer-implemented method for classifying a lesion, comprising:

receiving a first medical image of an examination volume, the first medical image corresponding to a first examination time;
receiving a second medical image of the examination volume, the second medical image corresponding to a second examination time, different from the first examination time;
determining a first lesion area corresponding to a lesion within the first medical image;
determining a registration function based on a comparison of the first medical image and the second medical image;
determining a second lesion area within the second medical image based on the registration function and the first lesion area; and
classifying the lesion within the first medical image based on the second lesion area.

According to an embodiment, the invention relates to a computer-implemented method for providing a trained classifying function, comprising:

receiving a first medical training image of a training examination volume, the first medical training image corresponding to a first examination time;

receiving a second medical training image of the training examination volume, the second medical training image corresponding to a second examination time, different from the first examination time;

determining a first lesion area corresponding to a lesion within the first medical training image;

determining a registration function based on a comparison of the first medical training image and the second medical training image;

receiving a training classification corresponding to a first lesion area within the first medical training image;

determining a second lesion area within the second medical training image, based on the registration function and the first medical training image;

applying a trained classifying function to first training input data and second training input data, to generate training output data, the first training input data being based on the first lesion area and the second training input data being based on the second lesion area;

adjusting at least one parameter of the trained classifying function based on a comparison of the training classification and the training output data; and providing the trained classifying function.

According to an embodiment, the invention relates to a classification system for classifying a lesion, comprising:
an interface configured to
receive a first medical image of an examination volume, the first medical image corresponding to a first examination time,
receive a second medical image of the examination volume, the second medical image corresponding to a second examination time, different from the first examination time; and
at least one processor configured to
determine a first lesion area corresponding to a lesion within the first medical image,
determine a registration function based on a comparison of the first medical image and the second medical image,
determine a second lesion area within the second medical image based on the registration function and the first lesion area, and
classify the lesion within the first medical image based on the second lesion area.

According to an embodiment, the invention relates to a medical imaging system, comprising: the classification system of claim an embodiment.

According to an embodiment, the invention relates to a non-transitory computer program product storing instructions which, when the program is executed by a classification system, cause the classification system to carry out the method of an embodiment.

According to an embodiment, the invention relates to a non-transitory computer-readable medium storing instructions which, when executed by a classification system, cause the classification system to carry out the method of an embodiment.

According to an embodiment, the invention relates to a non-transitory computer-readable storage medium, storing a trained classifying function provided by the method according to an embodiment, for use in a method for classifying a lesion upon execution by at least one processor.

BRIEF DESCRIPTION OF THE DRAWINGS

The properties, features and advantages of this invention described above, as well as the manner they are achieved, become clearer and more understandable in the light of the following description and embodiments, which will be described in detail in the context of the drawings. This following description does not limit the invention on the contained embodiments. Same components or parts can be labeled with the same reference signs in different figures. In general, the figures are not for scale. In the following.

DETAILED DESCRIPTION OF THE EXAMPLE EMBODIMENTS

Figure 1:
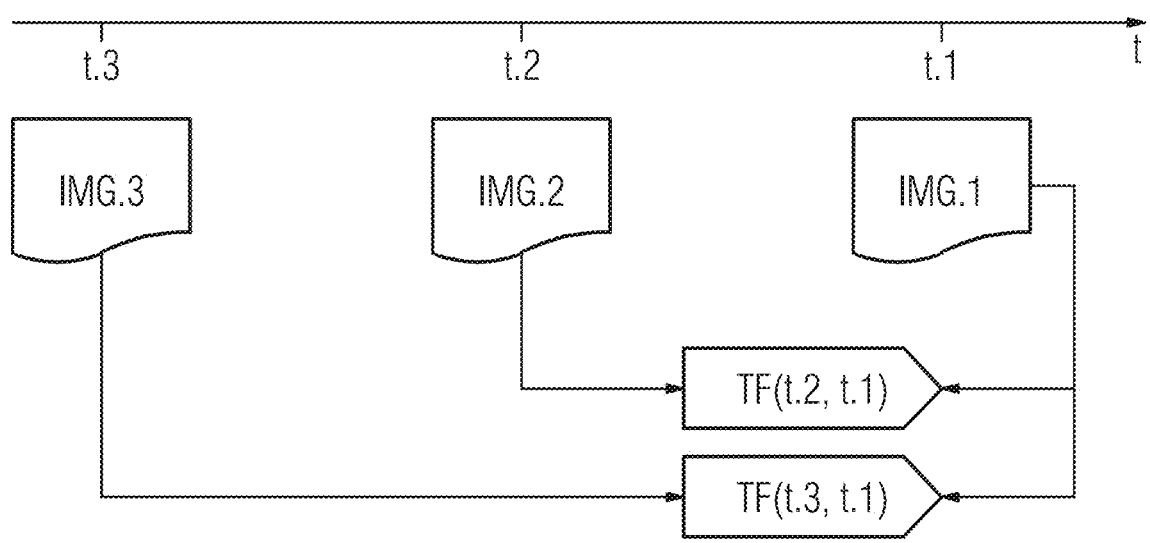
FIG. 1 displays a timeline indicating the relation between medical images and registration functions, FIG. 2 displays a data flow diagram for embodiments of the method for classifying a lesion, FIG. 3 displays a recurrent neural network comprising LSTM blocks as trained classifying function, FIG. 4 displays a first embodiment of the method for classifying a lesion, FIG. 5 displays a second embodiment of the method for classifying a lesion, FIG. 6 displays a third embodiment of the method for classifying a lesion, FIG. 7 displays a fourth embodiment of the method for classifying a lesion, FIG. 8 displays an embodiment of the method for providing a trained classifying function, FIG. 9 displays a classification system, FIG. 10 displays a training system.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature (s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/ DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment, the invention relates to a computer-implemented method for classifying a lesion, comprising receiving a first medical image of an examination volume, wherein the first medical image corresponds to a first examination time, furthermore comprising receiving a second medical image of the examination volume, wherein the second medical image corresponds to a second examination time being different from the first examination time, furthermore comprising determining a first lesion area corresponding to the lesion within the first medical image, furthermore comprising determining a registration function based on a comparison of the first medical image and the second medical image, determining a second lesion area within the second medical image based on the registration function and the first lesion area, and furthermore comprising classifying the lesion within the first medical image based on the second lesion area.

In particular, the steps of receiving the first medical image and receiving the second medical image are executed by an interface, in particular, by an interface of a classification system. In particular, the step of determining the first lesion area, of determining the registration function, of determining the second lesion area and of classifying the lesion are executed by a computation unit, in particular, by a computation unit of the classification system.

In particular, a lesion corresponds to a damage or a change in a tissue of an organism (in particular, a mammal, in particular, a human), usually caused by disease or trauma. In particular, a lesion can be caused by a tumor, and classified according to its benignancy and/or its malignancy.

A medical image corresponds to the result of a medical imaging examination. A medical image can comprise additional data (in particular, meta-data). In particular, a medical image can be an X-ray image, a computed-tomography image, an ultrasound image, a magnetic resonance image, a positron emission tomography image, a single-photon emission computed tomography image, and/or a digital pathology image. In particular, the first medical image and the second medical image are of the same type.

In particular, a medical image is two-dimensional medical image, a three-dimensional medical image and/or a four-dimensional medical image. A medical image can comprise a plurality of pixels or voxels (the terms "pixels" and "voxels" are used as synonyms within this specification and correspond to the elementary building blocks of an image).

In particular, each pixel or voxel comprises an assigned intensity value. In particular, the intensity value of a pixel can correspond to an X-ray attenuation value of tissue mapped by the respective pixel or voxel.

In particular, each medical image corresponds to an examination time, being the point in time the medical image was created. The first medical examination time can be earlier in time than the second medical examination time, or vice versa.

In particular, a registration function is a function which maps an input medical image to an output medical image. In particular, the registration function assigns for a subset of pixels or voxels of the input medical image corresponding pixels or voxels in the output medical image. In particular, the input medical image and the output medical image have the same dimensionality. In particular, the first medical image is the input medical image, and the second medical image is the output medical image.

The registration function can be an intensity-based registration function and/or a feature-based registration function. The registration function can be based on a linear (or affine) transformation or based on a non-linear transformation. A non-linear transformation can be based on radial basis functions, physical continuum models and/or large deformation models (e.g. diffeomorphisms). A registration function can be based on a frequency-domain representation of the first and/or the second medical image, e.g. a Fourier or a Laplace transformation of the first and/or the second medical image. A registration function can be determined manually, interactively, semi-automatically or automatically. In particular, a registration function can be determined by applying a trained registration function (e.g. a convolutional or a non-convolutional neural network) based on known training registrations of pairs of training images.

In particular, a lesion area is an area or a region in a medical image corresponding to a lesion. In particular, the lesion area can comprise all pixels or voxels of the medical image corresponding to the lesion. In particular, the first lesion area is a lesion area within the first medical image. In particular, the second lesion area is a lesion area within the second medical image. In particular, the first lesion area and the second lesion area correspond to the same lesion. In particular, a lesion area can be a segmentation or a mask of a lesion within the corresponding medical image.

The step of classifying a lesion can comprise determining a classification value corresponding to a lesion (or the first and the second lesion area) and/or providing the classification value. Providing the classification value can comprise storing, displaying or transmitting the classification value.

The inventors recognized that by the classification being based on the second lesion area and the second medical image, longitudinal information of the disease pathway can be considered. By using a registration function to determine the second lesion based on the first lesion area, it is also possible to use the additional data even if from the second medical image alone a lesion area is not detectable (fully) by conventional methods.

According to a further possible embodiment of the invention, determining the second lesion area is based on applying the registration function to the first lesion area. In particular, the pixels or voxels corresponding to the first lesion area are mapped to pixels or voxels within the second medical image, and the set of these pixels or voxels within the second medical image defines the second lesion area within the second medical image. In particular, the second lesion area defined by a set of pixels and voxels can be the convex hull of said set of pixels or voxels. Alternatively, the pixels or voxels corresponding to the boundary of the first lesion area are mapped to pixels or voxels within the second medical image, and the convex hull of the set of these pixels or voxels within the second medical image defines the second lesion are within the second medical image.

The inventors recognized that by applying the registration function to the first lesion area the second lesion area can be determined in a fast and effective manner. By relying on the convex hull, an efficient error correction algorithm can be used for cases where some pixels or voxels of the second medical image are not a mapping target due to numerical or rounding errors.

According to a further possible embodiment of the invention, the step of classifying the lesion is furthermore based on the first lesion area. The inventors recognized that by classifying the lesion being based on the first lesion area and the second lesion area longitudinal information can be incorporated very efficiently into the classification process.

According to a further embodiment of the invention, the step of classifying the lesion comprises the sub-step of applying a trained classifying function to first input data and second input data, thereby generating output data, wherein the first input data is based on the first lesion area, wherein the second input data is based on the second lesion area, and wherein the step of classifying the lesion comprises the sub-step of determining a lesion classification based on the output data. In particular, the lesion classification can be identical with the output data.

A trained classifying function is a trained function. In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Q-learning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

The inventors recognized that using a trained classification function all features corresponding to the first and the second lesion area can be considered for creating the output data and the classification value. In particular, also correlations not recognized by a human expert can be utilized for inferring the output data and the classification value.

By the input of the trained classification function being based on the first lesion area and the second lesion area, correlations between different stages of the development of the lesion can be considered. By considering such correlations, the lesion qualification can be better and more exact than based only separately on medical images of different points in time.

According to a further embodiment of the invention, wherein the trained classifying function is a recurrent neural network, wherein the first input data and the second input data are independently used as input data for the recurrent neural network.

In particular, a recurrent neural network is an artificial neural network where connections between nodes form a directed graph along a temporal sequence. In particular, a recurrent neural network can be interpreted as directed acyclic graph. In particular, the recurrent neural network can be a finite impulse recurrent neural network or an infinite impulse recurrent neural network (wherein a finite impulse network can be unrolled and replaced with a strictly feedforward neural network, and an infinite impulse network cannot be unrolled and replaced with a strictly feedforward neural network). In particular, the recurrent neural network can comprise additional storage states or additional network structures that incorporate time delays or comprise feedback loops.

Equivalently, a recurrent neural network could also be defined as a neural network whose output does not only depend on the input value and the edge weights, but also on a hidden state vector, wherein the hidden state vector is based on previous inputs used on the recurrent neural network.

The inventors recognized that using a recurrent neural network variable length sequences of inputs can be used. In particular, this implies that the method cannot be used only for a fixed number of medical images or lesion areas (and needs to be trained differently for every other number of medical images or lesion areas used as input), but can be used for an arbitrary number of input medical images or input lesion areas. This implies that the whole set of training data, independent of the number of successive medical images or lesion areas, can be used within the training of the trained classification function, and that the training data is not reduced to training data corresponding to a certain number of successive medical images or lesion areas.

In particular, by using the first input data and the second input data independently as input to the recurrent neural network, information from applying the recurrent neural network to the second input data can be stored within the hidden state, and can be used as additional information when applying the recurrent network to the first input data. This behavior leads to the output data and the classification value being based on the sequence of lesion areas, so the classification of the lesion can be done with a high precision and taking into account the time development of the lesion.

According to a further embodiment of the invention the recurrent neural network comprises at least one LSTM (acronym for "long short-term memory") block.

In particular, a LSTM block comprises a cell, an input gate, an output gate and a forget gate, wherein the cell corresponds to the hidden vector, and the input gate, the output gate and the forget gate regulate the flow of information into and out of the cell. In particular, by using a cell, LSTM blocks can prevent exploding and vanishing gradient problems that can be encountered when training other types of recurrent neural networks.

The inventors recognized that LSTM blocks are suited for input data that is separated by diverse or even unknown time intervals, and so are suited for a use in longitudinal medical imaging studies, because the time differences between different images in the longitudinal studies are in general not constant, and may even be unknown.

According to a further embodiment of the invention, the step of classifying furthermore comprises the sub-step of determining the first input data by applying a trained preprocessing function to at least a part of the first medical image containing the first lesion area. Furthermore, the step of classifying comprises the sub-step of determining the second input data by applying the trained preprocessing function to at least a part of the second medical image containing the second lesion area. In particular, the trained preprocessing function is a trained function.

The at least part of the first medical image containing the first lesion area is a subset of the first medical image, wherein the subset comprises the first lesion area. The at least part of the second medical image containing the second lesion area is a subset of the second medical image, wherein the subset comprises the second lesion area.

In particular, the trained preprocessing function is applied to the at least part of the first medical image by applying the trained preprocessing function to a pixel-wise or voxel-wise product of a mask defined by the first lesion area and the first medical image. In particular, the trained preprocessing function is applied to at least part of the second medical image by applying the trained preprocessing function to a product of a mask defined by the second lesion area and the second medical image.

The inventors recognized that by using trained preprocessing function relevant features of the first medical image and the second medical image, and/or the first lesion area and the second lesion area, can be extracted from the respective objects before using the data as input to the trained classification network. In particular, the trained preprocessing function can be used for normalization of the input data (e.g. to get input data with the same brightness and contrast).

According to a further embodiment of the invention, the trained preprocessing function is configured by training to classify lesions within single medical images. In particular, the trained preprocessing function is trained to classify lesions within single medical images by at least one of their parameters being adapted based on a comparison of an training output and a real classification value of a lesion, wherein the training output is the result of applying the trained preprocessing function to a training medical image. In particular, classifying based on single medical images means that only medical images acquired at a certain time are used as input, and not longitudinal studies.

The inventors recognized that by using trained preprocessing functions configured to classify lesions within single medical image known image classifications functions can be used as trained preprocessing function in order to reduce the training effort for the trained classification function.

According to a further possible embodiment of the invention, the trained preprocessing function is a convolutional neural network. In particular, the trained preprocessing function is a deep convolutional network. The inventors recognized that a convolutional network and a deep convolutional network are well-suited for image processing and extracting features from images.

According to a further embodiment of the invention, the registration function is a non-rigid registration function. A synonym for "non-rigid registration function" is "elastic registration function".

In general, a rigid registration function preserves value of the Euclidean distance of two points, so that $d(TF(x), TF(y)) = d(x, y)$, where $d(x, y)$ is the distance of two points, and $TF(x)$ is the result of applying the registration function to a point. A non-rigid registration function does not preserve the value of the Euclidean distance of two points.

In particular, the non-rigid registration function can be a radial basis function (in particular, selected from the group of thin-plate transformations or surface spline transformations, multiquadric transformations, and compactly-supported transformations), physical continuum models (e.g., viscous fluid models), and large deformation models (diffeomorphism transformations).

The inventors recognized that by using a non-rigid registration function local geometric differences between the first medical image and the second medical image can be considered. In particular, those local geometric differences can occur due to physical changes in the examination volume in-between the first and the second medical imaging examination, or due to different poses of the patient when performing the first and the second medical imaging examination. In particular, non-rigid transformations can be helpful if a growing lesion effects changes in the neighboring examination volume.

According to a further embodiment of the invention, determining the registration function is based on a vector momentum-parameterized stationary velocity field (an acronym is "vSVF"). Methods for vSVF are known e.g. from Z. Shen et al., "Networks for Joint Affine and Non-Parametric Image Registration" (20019) 4219-4228. 10.1109/CVPR.2019.00435, the entire contents of which are hereby incorporated herein by reference. In particular, vSVF is a fluid dynamic method that deforms the image according to a smooth velocity field, where the deformation map can be accumulated along the time.

The inventors recognized that using vSVF techniques registration functions can be determined in a faster way, with a better control of transformation regularity, than other comparable registration techniques.

According to a further embodiment of the invention, the first medical image and the second medical image are two-dimensional or three-dimensional X-ray based medical images.

In particular, an X-ray based medical image is a medical image that was recorded by means of X-ray radiation. In particular, a three-dimensional X-ray based medical image can be a computed tomography image.

The inventors recognized that the described methods are especially well suited for X-ray based medical images.

According to a second embodiment, the invention relates to a computer-implemented method for providing a trained classifying function. The method is based on receiving a first medical training image of a training examination volume, wherein the first medical training image corresponds to a first examination time, and on receiving a second medical training image of the training examination volume, wherein the second medical training image corresponds to a second examination time being different from the first examination time. Furthermore, the method is based on determining a registration function based on a comparison of the first medical training image and the second medical training image. Furthermore, the method is based on determining a first lesion area corresponding to a lesion within the first medical training image. Furthermore, the method is based on receiving a training classification corresponding to a first lesion area within the first medical training image. Furthermore, the method is based on determining a second lesion area within the second medical training image based on the registration function and the first medical training image. Furthermore, the method is based on applying a trained classifying function to first training input data and second training input data, thereby generating training output data, wherein the first training input data is based on the first lesion area, and wherein the second training input data (TID.2) is based on the second lesion area (LA.2). Furthermore, the method is based on adjusting at least one parameter of the trained classifying function based on a comparison of the training classification and the output data. Furthermore, the method is based on providing the trained classifying function.

In particular, the steps of receiving the first medical training image, of receiving the second medical training image, of receiving the training classification and of providing the trained classifying function are executed by an interface, in particular, by an interface of a providing system. In particular, the steps of determining the registration function, of determining the second lesion area, of applying the trained classifying function, and of adjusting at least one parameter of the trained classifying function are executed by a computation unit, in particular, by a computation unit of the providing system.

The inventors recognized that based on this method a trained classification function can be provided in an efficient way, wherein at the same time the trained classification function can produce high quality results in classifying lesions in longitudinal studies.

According to a third embodiment, the invention relates to a classification system comprising an interface configured for receiving a first medical image of an examination volume, wherein the first medical image corresponds to a first examination time, furthermore configured for receiving a second medical image of the examination volume, wherein the second medical image corresponds to a second examination time being different from the first examination time; and a computation unit configured for determining a first lesion area corresponding to the lesion within the first medical image;

furthermore configured for determining a registration function based on a comparison of the first medical image and the second medical image;

furthermore configured for determining a second lesion area within the second medical image based on the registration function and the first lesion area;

furthermore configured for classifying the lesion within the first medical image based on the second lesion area.

In particular, the classification system is configured for executing the method for classifying a lesion according to the invention and its aspects. In particular, the classification system is configured for executing the method for classifying a lesion by the interface and the computation unit being configured for executing the single steps of the method for classifying a lesion.

According to a fourth embodiment, the invention relates to a medical imaging system, comprising a classification system to the invention and its aspects. In particular, the medical imaging system can be an X-ray based medical imaging system, e.g. a computed tomography system or a fluoroscopy system.

According to a fifth embodiment, the invention relates to a providing system comprising an interface and a calculation unit:

wherein the interface is configured for receiving a first medical training image of a training examination volume, wherein the first medical training image corresponds to a first examination time, wherein the interface is furthermore configured for receiving a second medical training image of the training examination volume, wherein the second medical training image corresponds to a second examination time being different from the first examination time, wherein the calculation unit is configured for determining a registration function based on a comparison of the first medical training image and the second medical training image, wherein the calculation unit is furthermore configured for receiving a training classification corresponding to a first lesion area within the first medical training image, wherein the calculation unit is furthermore configured for determining a second lesion area within the second medical training image based on the registration function and the first medical training image, wherein the calculation unit is furthermore configured for applying a trained classifying function to first training input data and second training input data, thereby generating training output data, wherein the first training input data is based on the first lesion area, wherein the second training input data is based on the second lesion area, wherein the calculation unit is furthermore configured for adjusting at least one parameter of the trained classifying function based on a comparison of the training classification and the output data, wherein the interface is furthermore configured for providing the trained classifying function (TCF).

According to a sixth embodiment, the invention relates to a computer program comprising instructions which, when the program is executed by a classification system, cause the classification system to carry out the method for classifying a lesion according to an embodiment of the invention and its aspects.

According to a possible seventh embodiment, the invention relates to a computer program comprising instructions which, when the program is executed by a providing system, cause the providing system to carry out the method for providing a trained classification function according to an embodiment of the invention and its aspects.

According to an eighth embodiment, the invention relates to a computer-readable medium comprising instructions which, when executed by a classification system, cause the classification system to carry out the method for classifying a lesion according to an embodiment of the invention and its aspects.

According to a possible ninth embodiment, the invention relates to a computer-readable medium comprising instructions which, when executed by a providing system, cause the providing system to carry out the method for providing a trained classification function according to an embodiment of the invention and its aspects.

The realization of the invention by a computer program product and/or a computer-readable medium has the advantage that already existing providing systems can be easily adopted by software updates in order to work as proposed by the invention.

The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

According to a tenth embodiment, the invention relates to a computer-readable storage medium, comprising a trained classifying function provided by a method for providing a trained classifying function according to an embodiment of the invention and its aspects, for use in a method for classifying a lesion.

According to a possible eleventh embodiment, the invention relates to a computer-readable storage medium, comprising a trained classifying function provided by a method for providing a trained classifying function according to an embodiment of the invention and its aspects.

According to a possible twelfth embodiment, the invention relates to a method of using a computer-readable storage medium, comprising a trained classifying function provided by a method for providing a trained classifying function according to an embodiment of the invention and its aspects, for classifying a lesion.

FIG. 1 displays the relation between medical images IMG.1, IMG.2, IMG.3 and registration functions TF(t.2, t.1), TF(t.3, t.1).

The first medical image IMG.1 corresponds to a first examination time t.1, the second medical image IMG.2 corresponds to a second examination time t.2, and the third medical image IMG.3 corresponds to a third examination time t.3. The first medical examination time t.1 is later than the second medical examination time t.2, and the second medical examination time t.2 is later than the third medical examination time t.3.

Each registration function TF(t.2, t.1), TF(t.3, t.1) is based on a pair of medical images IMG.1, IMG.2, IMG.3. In particular, each registration function TF(t.2, t.1), TF(t.3, t.1) is based on a pair of medical images IMG.1, IMG.2, IMG.3 comprising the first medical image IMG.1 and another medical image IMG.2, IMG.3. In particular, the registration function maps coordinates of the first medical image IMG.1 to coordinates of the another medical image IMG.2, IMG.3. The coordinates can be represented by real numbers, and/or by integer numbers corresponding to pixels. In particular, the registration function maps pixels or voxels of the first medical image to pixels or voxels of the second medical image.

For example, if the first medical image IMG.1 and the second medical image IMG.2 are two-dimensional medical images, the registration function TF(t.2, t.1) maps a pixel P.1 of the first medical image IMG.1 coordinatized by coordinates P.1=(i.1, j.1) to a pixel P.2 of the second medical image IMG.2 coordinatized by coordinates P.2=(i.2, j.2) by (i.2, j.2)=TF(t.2, t.1) (i.1, j.1).

If the first medical image IMG.3 and the second medical image IMG.3 are three-dimensional medical images, the registration function TF(t.2, t.1) maps a voxel P.1 of the first medical image IMG.1 coordinatized by coordinates P.1=(i.1, j.1, k.1) to a voxel P.2 of the second medical image IMG.2 coordinatized by coordinates P.2 (i.2, j.2, k.2) by (i.2, j.2, k.2)=TF(t.2, t.1) (i.1, j.1, k.1).

The registration function TF(t.2, t.1) can also be used for mapping a first area within the first medical image IMG.1 to a second area within the second medical image IMG.2, wherein an area is e.g. by a set of pixels or voxels of the respective image. For example, the first area comprising pixels of first medical image IMG.1 is mapped to a set of pixels in the second medial image IMG.2 forming the second area in the second medical image IMG.2, wherein the second area in the second medical image comprises the resulting pixels of applying the registration function TF(t.2, t.1) pixel-wise to the pixels of the first area.

Figure 2:
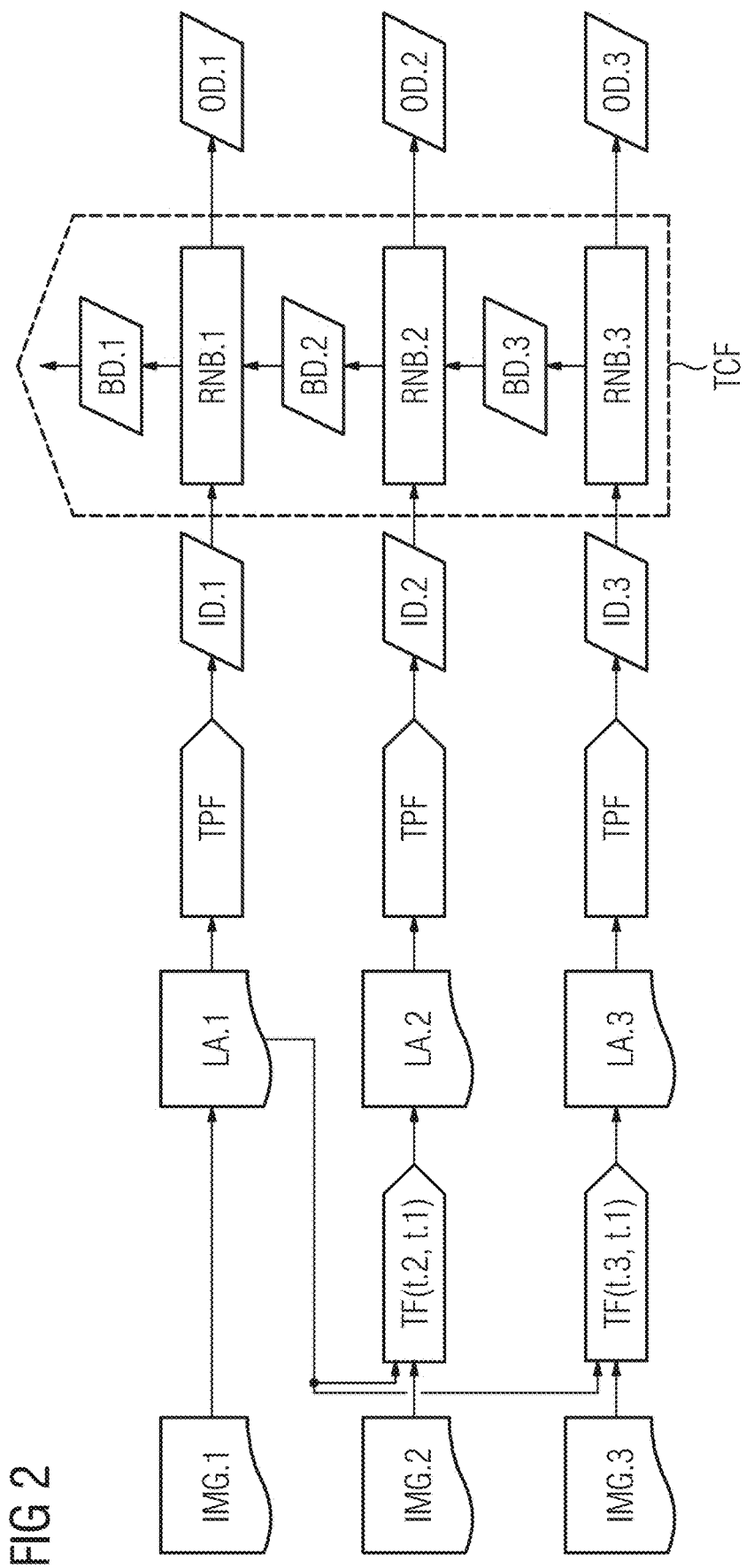

FIG. 2 displays a data flow diagram for some embodiments of the method for classifying a lesion. In this data flow diagram, three medical images IMG.1, IMG.2, IMG.3 are used as input, wherein a registration function TF(t.2, t.1) for the first medical image IMG.1 and the second medical image IMG.2 and a registration function TF(t.3, t.1) for the first medical image IMG.1 and the third medical image IMG.3 is calculated as displayed in FIG. X.

The first medical image IMG.1 comprises a first lesion area LA.1, comprising several pixels or voxels of the first medical image IMG.1. The registration functions TF(t.2, t.1), TF(t.3, t.1) are used to determine a second lesion area LA.2 within the second medical image IMG.2 and a third lesion area LA.3 within the third medical image IMG.3, in particular by LA.2=TF (t.2, t.1) (LA.1) und LA.3=TF (t.3, t.1) (LA.1).

In this embodiment, the lesion areas LA.1, LA.2, LA.3 are used as inputs for a trained preprocessing function TPF in order to determine input data ID.1, ID.2, ID.3 by ID.i=TPF (LA.i). In particular, the trained preprocessing function TPF is trained convolutional neural network. The lesion areas LA.1, LA.2, LA.3 can be used as inputs for the trained preprocessing function TPF also in combination with the respective medical image IMG.1, IMG.2, IMG.3, e.g. by using a pixel-wise or voxel-wise product of the lesion area LA.1, LA.2, LA.3 being a mask image and the respective medical image IMG.1, IMG.2, IMG.3 by ID.i=(LA.i× IMG.i), wherein × denotes the pixel-wise or the voxel-wise product. Alternatively, no trained preprocessing function TPF needs to be used, in this case the input data ID.1, ID.2, ID.3 is equivalent with the lesion area LA.1, LA.2, LA.3 (or, e.g., with the pixel-wise or voxel-wise product of the lesion area LA.1, LA.2, LA.3 as mask and the respective medical image IMG.1, IMG.2, IMG.3).

The input data ID.1, ID.2, ID.3 is then used as input for a trained classification function TCF. In this embodiment, the trained classification function TCF is a recurrent neural network comprising recurrent neural network blocks RNB.1, RNB.2, RNB.3. In particular, each input data ID.1, ID.2, ID.3 is used as input for a different one of the recurrent neural network blocks RNB.1, RNB.2, RNB.3.

Every recurrent neural network block RNB.1, RNB.2, RNB.3 determines output data OD.1, OD.2, OD.3 and intermediate data BD.1, BD.2, BD.3, wherein the intermediate data BD.1, BD.2, BD.3 is used as additional input for the next of the successive recurrent neural network blocks RNB.1, RNB.2, RNB.3.

The classification value of the lesion can then be based on all of the output data OD.1, OD.2, OD.3, or only on some of the output data OD.1, OD.2, OD.3. In particular, the classification value of the lesion is based on the output data OD.1 related to the first medical image IMG.1, and potentially on further output data OD.2, OD.3. By being based at least on the output data OD.1 corresponding to the first medical image IMG.1, the most recent one of the medical images IMG.1, IMG.2, IMG.3 can be used with a high weight in the classification of the lesion, implying a better and more exact classification.

Figure 3:
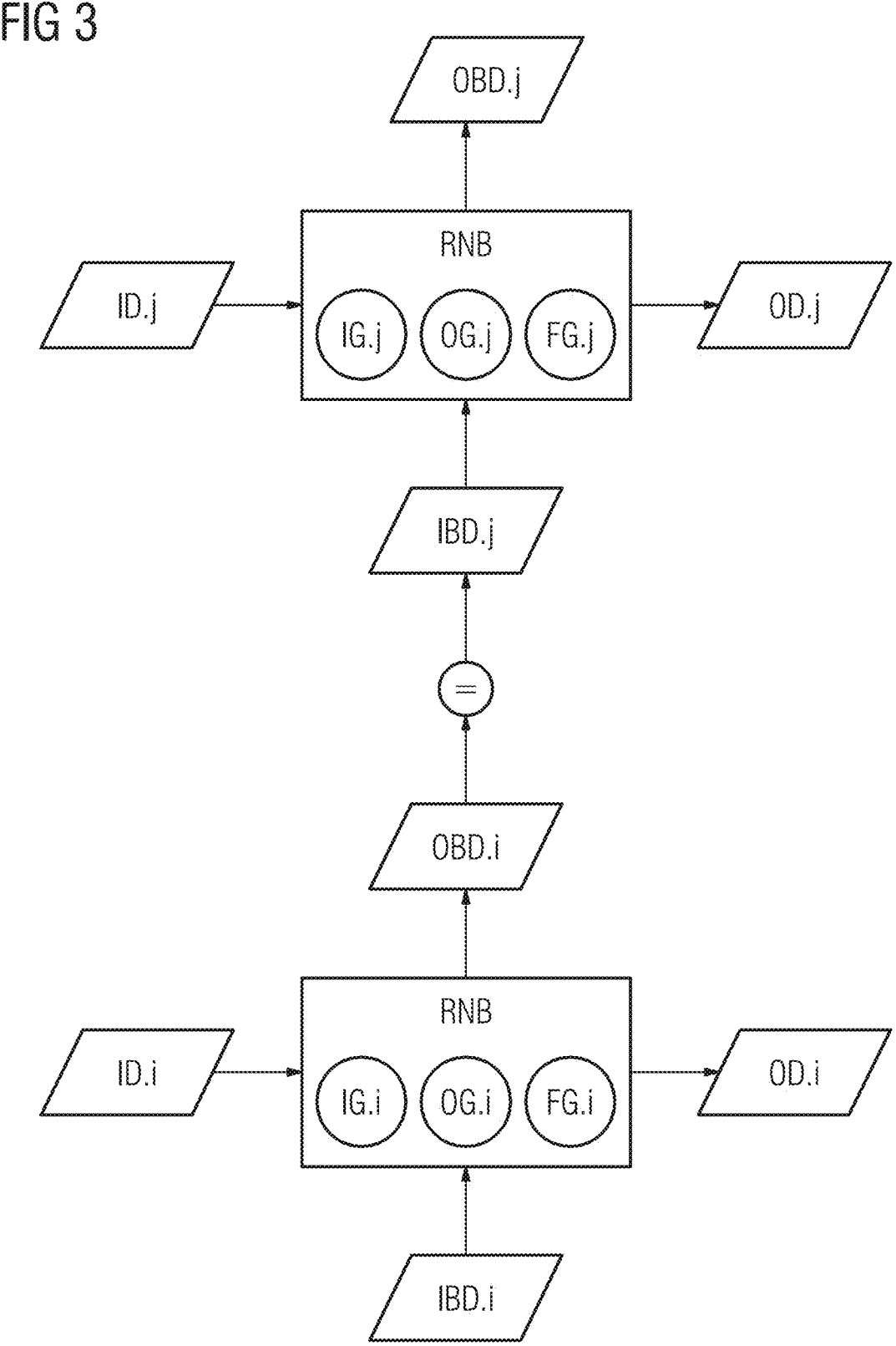

FIG. 3 displays a detailed view of an LSTM network comprising several recurrent neural network blocks RNB.i, RNB.j. Each recurrent neural network block RNB.i, RNB.j uses input data ID.i, ID.j to generate or calculate output data OD.i, OD.j. Additionally, each recurrent neural network block RNB.i, RNB.j takes as additional input intermediate data IBD.i, IBD.j and produces as additional output intermediate data OBD.i, OBD.j, wherein output intermediate data OBD.i, OBD.j can be used as input intermediate data IBD.i, IBD.j within the next step.

It is important to understand that FIG. 3 displays an iterative process, which was unfolded for two inputs. In order to adapt for more input data, the iteration can be extended to cover an arbitrary number of input data ID.i, ID.j. Furthermore, the recurrent neural network blocks RNB.i, RNB.j are the same up to a number of internal states IG.i, IG.j, OG.i, OG.j, FG.i, FG.j. In particular, this implies that the output of a neural network block RNB.i, RNB.j only depends on the input data ID.i, ID.j, the additional input intermediate data IBD.i, IBD.j and the internal states IG.i, IG.j, OG.i, OG.j, FG.i, FG.j.

In this embodiment, the neural network is an LSTM network, and the recurrent neural network block RNB.i, RNB.j has internal states denoted as input gate IG.i, IG.j, output gate OG.i, OG.j and forget gate FG.i, FG.j. In particular, the value of these internal states can be calculated as $$i_j = \sigma(W^{(x,I)} * x_j + W^{(y,I)} * y_i + W^{(c,I)} \cdot c_i + b^{(I)})$$

$$f_j = \sigma(W^{(x,F)} * x_j + W^{(y,F)} * y_i + W^{(c,F)} \cdot c_i + b^{(F)})$$

$$o_j = \sigma(W^{(x,O)} * x_j + W^{(y,O)} * y_i + W^{(c,O)} \cdot c_j + b^{(O)})$$

$$c_j = f_j \cdot c_i + i_j \cdot \tanh(W^{(x,C)} * x_j + W^{(y,C)} * y_i + b^{(C)})$$

$$y_j = o_j \cdot \tanh(c_j)$$

Within this iteration, the operation "·" is a pointwise multiplication, "*" is a convolution operation, and "σ" denotes the Sigmoid function. The values $i_j$, $o_j$ and $f_j$ correspond to the values of the input gate IG.j, the output gate OG.j and the forget gate FG.j. The values $x_j$ and $y_j$ correspond to the input data ID.j and the output data OD.j of the respective block. The values $c_i$ and $c_j$ correspond to the intermediate input intermediate data IBD.i and the output intermediate data OBD.i, OBD.j, and are often denoted as "cell state". The values W and b correspond to weights of the network, which are fixed by training the recurrent neural network.

In an alternative embodiment, one can simplify the update by not letting the cell state influence the updating of the input gate IG.i, IG.j, the output gate OG.i, OG.j and the forget gate FG.i, FG.j:

$$i_j = \sigma(W^{(x,I)} * x_j + W^{(y,I)} * y_i + b^{(I)})$$

$$f_j = \sigma(W^{(x,F)} * x_j + W^{(y,F)} * y_i + b^{(F)})$$

$$o_j = \sigma(W^{(x,O)} * x_j + W^{(y,O)} * y_i + b^{(O)})$$

$$c_j = f_j \cdot c_i + i_j \cdot \tanh(W^{(x,C)} * x_j + W^{(y,C)} * y_i + b^{(C)})$$

$$y_j = o_j \cdot \tanh(c_j)$$

In another alternative embodiment, the calculation of the cell state can be modified in the following way:

$$c_j = f_j \cdot c_i + (1 - f_j) \cdot \tanh(W^{(x,C)} * x_j + W^{(y,C)} * y_i + b^{(C)})$$

Figure 4:
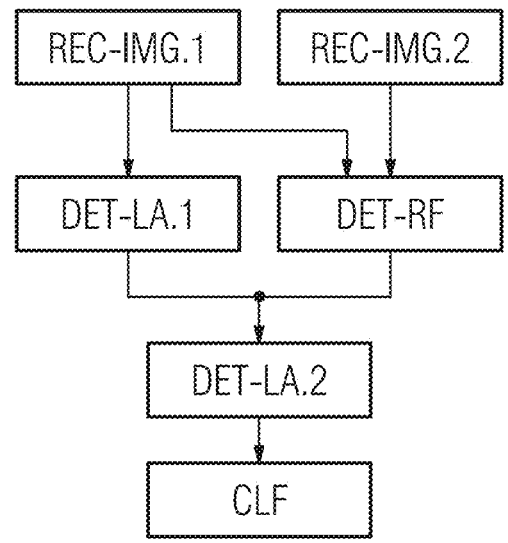

FIG. 4 displays a first embodiment of the computer-implemented method for classifying a lesion.

The first two steps of the displayed embodiment are receiving REC-IMG.1 a first medical image IMG.1 of an examination volume and receiving REC-IMG.2 a second medical image IMG.2 of the examination volume. The first medical image IMG.1 corresponds to a first examination time t.1 (which is the time the first medical image IMG.1 was determined based on a medical imaging examination), and the second medical image IMG.2 corresponds to a second examination time t.2 (which is the time the second medical image IMG.2 was determined based on another medical imaging examination). Here, the second examination time t.2 is earlier than the first examination time t.1, and the second examination time and the first examination time are different. In particular, the first and the second medical image IMG.1, IMG.2 can be part of a longitudinal study relating to a certain patient.

In this embodiment, both the first and the second medical image IMG.1, IMG.2 are three-dimensional images generated by means of a computed tomography imaging examination. Alternatively, the first and/or the second medical image IMG.1, IMG.2 can be based on other known method of medical imaging, e.g. magnetic resonance imaging, positron emission tomography or single photon emission computed tomography. In particular, both the first and the second medical image IMG.1, IMG.2 are DICOM images (acronym for "Digital Imaging and Communications in Medicine"). In particular, both the first and the second medical image IMG.1, IMG.2 have the same size (measured in terms of number of voxels) with respect to each of the dimensions of the respective medical images IMG.1, IMG.2.

A next step of the displayed first embodiment is determining DET-LA.1 a first lesion area LA.1 corresponding to a lesion within the first medical image IMG.1. In this embodiment, the lesion area corresponds to a segmentation of the lesion within the first medical image IMG.1. In particular, all voxels that are part of a segment corresponding to the lesion are considered as being part of the first lesion area LA.1, and all other voxels are considered as being not part of the first lesion area LA.1.

There are various possibilities for determining DETLA.1 a first lesion area LA.1 within a first medical image IMG.1 known to the person skilled in the art. In this embodiment, the method described in S. Ren et al. "Faster RCNN: Towards real-time object detection with region proposal networks" Advances in Neural Information Processing Systems 28 (NIPS 2015) is used), the entire contents of which are hereby incorporated herein by reference.

A further step of the displayed embodiment is determining DET-RF a registration function RF(t.2, t.1) based on a comparison of the first medical image IMG.1 and the second medical image IMG.2. This further step can be executed before, after or in parallel with the step of determining DET-LA.1 the first lesion area LA.1.

In this embodiment, the registration function RF(t.2, t.1) is a non-rigid registration function based on a vector momentum-parameterized stationary velocity field. Methods for determining such a registration function RF(t.2, t.1) are known e.g. from the paper Z. Shen et al. "Networks for Joint Affine and Non-Parametric Image Registration" (20019) 4219-4228, 10.1109/CVPR.2019.00435.

In particular, if v denotes the vector field, $\Phi^{-1}$ denotes the registration function RF(t.2, t.1) (also denoted as registration map), $I_1$ denotes the first medical image IMG.1 and $I_2$ denotes the second medical image IMG.2, the registration function RF(t.2, t.1) can be determined by minimizing $$m^* = \mathrm{argmin}_{m_0} \lambda_{v_f} <m_0, v_0> + \mathrm{sim}[I_1 \circ \Phi^{-1}(1), I_2].$$

The initial or boundary conditions are given by:

$$\Phi^{-1}_{,t} + D\Phi^{-1} v = 0; \Phi^{-1}(0) = \Phi^{-1}_{(0)}; v_0 = (L^+ L)^{-1} m_0.$$

Here, D denotes the Jacobian and $v0 = <L^+Lv, v>$ is a spatial norm defined by specifying the differential operator L and its adjoint $L^+$. Picking a specific L implies picking an expected model of deformation. In vSVF, the differential operator is spatially invariant and is predefined to encode a desired level of smoothness. The vector-valued momentum m is both spatio-temporal invariant and is equivalent to $m = L^+Lv$. The optimization takes places on m, where the velocity is smoothed from it. The resulting transformation is guaranteed to be diffeomorphic.

The next step of the displayed first embodiment is determining DET-LA.2 a second lesion area LA.2 within the second medical image IMG.2 based on the registration function RF(t.2, t.1) and the first lesion area LA.1. Within this first embodiment, the registration function RF(t.2, t.1) is used to map every voxel of the first medical image IMG.1 corresponding to the first lesion area LA.1 within the first medical image IMG.1 to at least one voxel of the second medical image IMG.2. All the voxels of the second medical image IMG.2 which are the result of such mapping are at least a part of the second lesion area LA.2 within the second medical image IMG.2. Further normalization procedures can be applied, e.g. the second lesion area LA.2 can be defined as the convex hull of all the voxels of the second medical image IMG.2 which are the result of such mapping.

The last step of the displayed second embodiment is classifying CLF the lesion within the first medical image IMG.1 based on the second lesion area LA.2. Within the second embodiment, the step of classifying CLF the lesion is furthermore based on the first lesion area LA.1. Within this embodiment, the first lesion area LA.1 and the second lesion area LA.2 (or, equivalently, the first and the second medical image IMG.1, IMG.2 with the first and the second lesion area LA.1, LA.2 being used as masks) are used as an input of a trained classification function TCF, which creates as an output a classification value of the lesion (e.g. a binary value whether the lesion is benign or malign).

Figure 5:
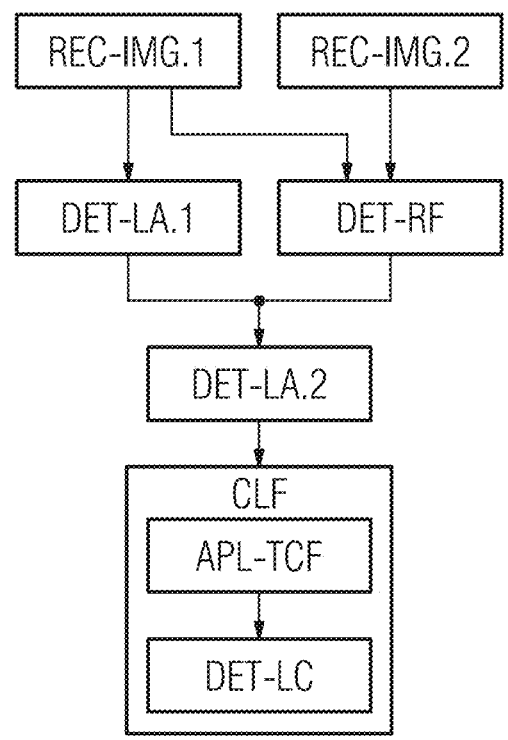

FIG. 5 displays a second embodiment of the computer-implemented method for classifying a lesion. The steps of receiving REC-IMG.1, REC-IMG.2 the first and the second medical image IMG.1, IMG.2, the step of determining DET-RF the registration function RF(t.2, t.1), and the steps of determining DET-LA.1, DET-LA.2 the first and the second lesion area LA.1, LA.2 are equivalent to the corresponding steps of the first embodiment and can comprise all advantageous embodiments of the respective steps.

In the second embodiment, the step of classifying CLF the lesion comprises the substep of applying APL-TCF a trained classifying function TCF to first input data ID.1 and second input data ID.2, thereby generating output data OD.1, OD.2. Herein the first input data ID.1 is based on the first lesion area LA.1, and the second input data ID.2 is based on the second lesion area LA.2. In particular, the first input data ID.1 is based on a mask defined by the first lesion area LA.1 and the first medical image IMG.1, and the second input data ID.2 is based on a mask defined by the second lesion areas LA.2 and the second medical image IMG.2.

In this embodiment, the trained classifying function TCF is a recurrent neural network. The recurrent network can be applied to a sequence of input data ID.1, ID.2 by iteratively applying a block (comprising a or defined by a neural network) to an each input data ID.1, ID.2, keeping an internal state. For example, if B denotes such a block, $x_n$ denotes the n-th input data ID.1, ID.2, then $(y_n, h_n) = B(x_n, h_{n+1})$, wherein $y_n$ denotes the n-th output data OD.1, OD.2 and $h_n$ denotes the hidden state vector after the n-th application of the block B of the recurrent neural network. The notation $B_{HV}(x_n, h_{n+1}) = h_n$ can refer to the hidden vector part of the output of the block B. The initial value h of the hidden state vector can be initialized randomly or by a certain sequence (e.g., all entries can be set to 0 or 1).

Note that the iteration is defined "backwards", since the first input data ID.1 (denotes as x1) corresponds to the last data in the temporal sequence of the longitudinal study.

Specifically, if there are a first and a second medical image IMG.1, IMG2, the second output data OD.2 can be calculated by $(y_2, h_2) = B(x_2, h)$ and the first output data OD.1 can be calculated by $(y_1, h_1) = B(x_1, h_2) = B(x_1, B_{HV}(x_2, h))$ The step of classifying the lesion furthermore comprises the substep of determining DET-LC a lesion classification based on the output data OD.1, OD.2. In this embodiment, the lesion classification is a real number between 0 and 1, corresponding to the probability of the classified lesion being malign. Alternatively, the lesion classification can be a class label indicating a type of a lesion. In particular, the lesion classification can be equivalent to the output data OD.1 corresponding to the first medical image IMG.1.

Figure 6:
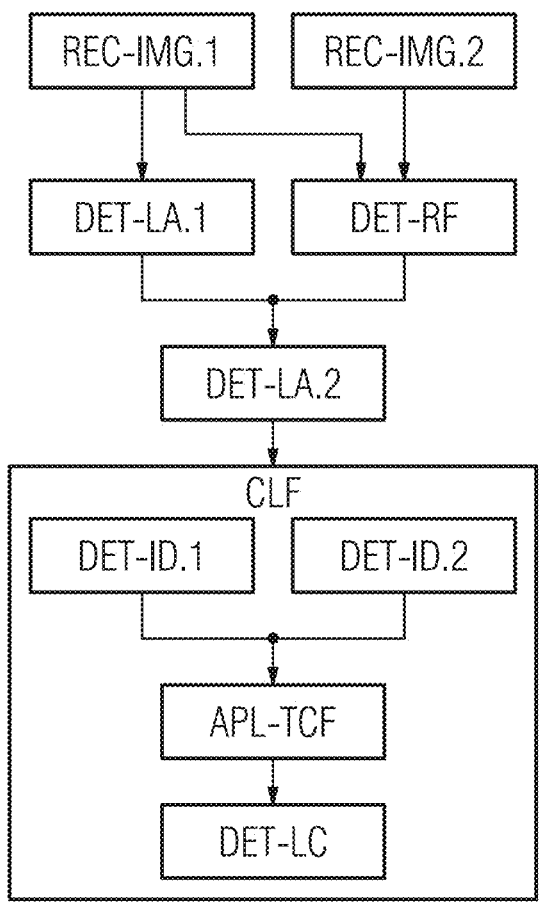

FIG. 6 displays a third embodiment of the computer-implemented method for classifying a lesion. The steps of receiving REC-IMG.1, REC-IMG.2 the first and the second medical image IMG.1, IMG.2, the step of determining DET-RF the registration function RF(t.2, t.1), the steps of determining DET-LA.1, DET-LA.2, the first and the second lesion area LA.1, LA.2, as well as the substeps of applying APL-TCF a trained classifying function TCF to first input data ID.1 and second input data ID.2 and of determining DET-LC a lesion classification are equivalent to the corresponding steps of the first embodiment and/or of the second embodiment and can comprise all advantageous embodiments of the respective steps.

Within the third embodiment, the step of classifying CLF the lesion comprises the substep of determining DET-ID.1 the first input data ID.1 by applying a trained preprocessing function TPF to at least a part of the first medical image IMG.1 containing the first lesion area LA.1, and the substep of determining DET-ID.2 the second input data ID.2 by applying the trained preprocessing function TPF to at least a part of the second medical image IMG.2 containing the second lesion area LA.2.

In this embodiment, the trained preprocessing function TPF is a convolutional deep neural network. In particular, the trained preprocessing function TPF is applied to a pixel-wise or voxel-wise multiplication of the respective lesion area LA.1, LA.2 being interpreted as mask and the respective medical image IMG.1, IMG.2.

If $I_n$ denotes the n-th medical image IMG.1, IMG.2, and $L_n$ corresponds to the n-th lesion area LA.1, LA.2, wherein $L_n$ has the same dimensionality and the same size as $I_n$, and $L_n = 0$ for a pixel or voxel not being part of the respective lesion area, and $L_n = 1$ for a pixel or voxel being part of the respective lesion area, then the n-th input data ID.1, ID.2 can be calculated as $x_n = TPF(I_n \cdot L_n)$.

In particular, within the notation of the second embodiment, if there are a first and a second medical image IMG.1, IMG2, the second output data OD.2 can be calculated by $(y_2, h_2) = B(TPF(I_2 \cdot L_2), h)$ and the first output data OD.1 can be calculated by $(y_1, h_1) = B(TPF(I_1 \cdot L_1), h2) = B(TPF(I_1 \cdot L_1), B_{HV}(TPF(I_2 \cdot L_2), h))$.

Figure 7:
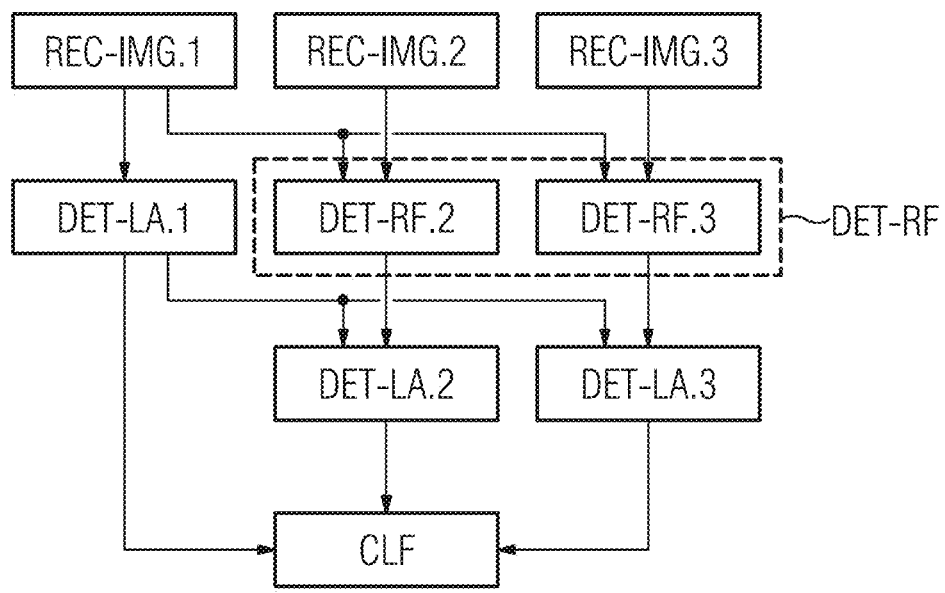

FIG. 7 displays a fourth embodiment of the computer-implemented method for classifying a lesion. The steps of receiving REC-IMG.1, REC-IMG.2 the first and the second medical image IMG.1, IMG.2, the step of determining DET-LA.1 the first lesion area LA.1, the step of determining DET-LA.2 the second lesion area LA.2 and the step of classifying the lesion can comprise all alternatives and advantageous embodiments of the first, the second and the third embodiment of the method for classifying a lesion above.

The fourth embodiment displays the extension of the method for three medical images IMG.1, IMG.2, IMG.3 within a longitudinal study. The third medical image IMG.3 is of the same type as the first and the second medical image IMG.1, IMG.2. The third medical image IMG.3 corresponds to a third time t.3, wherein the third time t.3 is earlier than the second time.

In contrast to the previous embodiments, the fourth embodiment also comprises the step of receiving REC-IMG.3 the third medical image IMG.3. If there would be additional medical images, there would be an additional step of receiving for each of the additional medical images.

Furthermore, in contrast to the previous embodiments, within the fourth embodiment the step of determining DET-RF a registration function RF(t.2, t.1), RF(t.3, t.1) comprises for each of the medical images IMG.2, IMG.3 except the first medical image IMG.1 a substep of determining DET-RF.2, DETRF.3 a registration function RF(t.2, t.1), RF(t.3, t.1) based on the first medical image IMG.1 and the respective other medical image IMG.2, IMG.3. In this fourth embodiment, the step of determining DET-RF a registration function RF(t.2, t.1), RF(t.3, t.1) comprises a substep of determining a first registration function RF(t.2, t.1) based on the first medical image IMG.1 and the second medical image IMG.2 and a substep of determining a second registration function RF(t.3, t.1) based on the first medical image IMG.1 and the third medical image IMG.3. If there would be additional medical images, there would be an additional substep of determining a registration function based on the first medical image and the respective additional medical image.

The fourth embodiment also comprises an additional step of determining DET-LA.3 a third lesion area LA.3 within the third medical image IMG.3. The step of determining DETLA.3 the third lesion area LA.3 is equivalent to the step of determining DET-LA.2 the second lesion area LA.2, wherein the second medical image IMG.2 is replaced with the third medical image IMG.3 (and the corresponding registration function RF(t.3, t.1) is used). If there would be additional medical images, for each of the additional medical images there would be an additional step of determining a lesion area.

Furthermore, the step of classifying CLF is based on all the lesion areas LA.2, LA.3.

Figure 8:
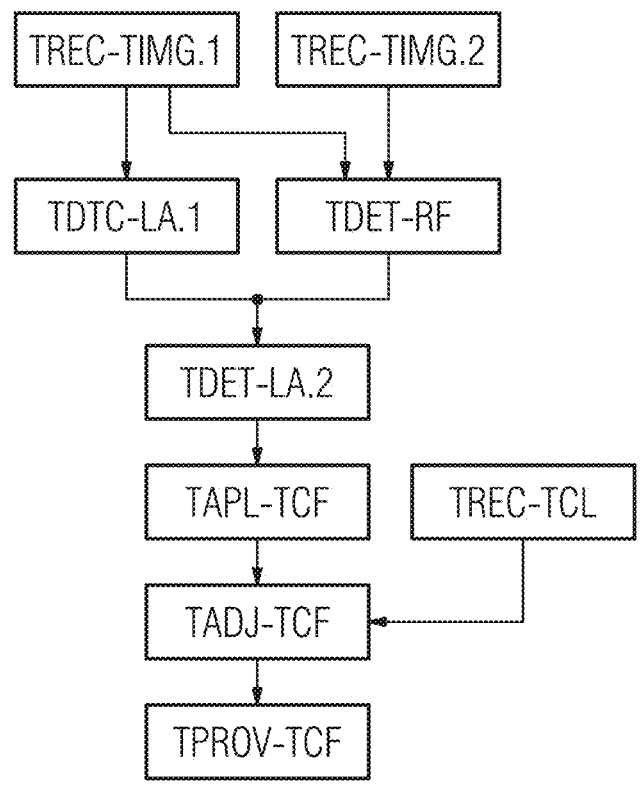

FIG. 8 displays a flow-chart of an embodiment of a computer-implemented method for providing a trained classifying function TCF.

The first steps of the displayed embodiments are receiving TREC-TIMG.1 a first medical training image of a training examination volume, wherein the first medical training image corresponds to a first examination time, and receiving a second medical training image of the training examination volume, wherein the second medical training image corresponds to a second examination time being different from the first examination time. The first and the second medical training image can comprise all advantageous features described in context of the first and the second medical training image with respect to FIG. 4.

In particular, both the first medical training image and the second medical training image are two-dimensional or three-dimensional X-ray based medical images.

Further steps of the displayed embodiment are determining TDET-LA.1 a first lesion area corresponding to a lesion within the first medical training image, determining TDET-RF a registration function based on a comparison of the first medical training image and the second medical training image, and determining a second lesion area within the second medical training image based on the registration function and the first medical training image. These three steps can comprise all advantageous features and embodiments described with the respective steps for the embodiments of the method for classifying a lesion displayed in one of FIG. 4 to FIG. 7.

Advantageously, the registration function is a non-rigid registration function. In particular, determining TDET-RF the registration function is based on a vector momentum-parameterized stationary velocity field. In particular, the registration function can be determined as described with respect to FIG. 4 and the method for classifying a lesion.

A further step of the displayed embodiment is receiving TREC-TCL a training classification corresponding to the first lesion area within the first medical training image. In particular, the training classification can be a binary value corresponding to whether the lesion corresponding to the first lesion area is a malign lesion or a benign lesion. Alternatively, the training classification can be a class label corresponding to the class of the lesion corresponding to the first lesion area, e.g. a BI-RADS (acronym for "Breast Imaging Reporting and Data System") classification value.

A further step of the displayed embodiment is applying TAPL-TCF a trained classifying function TCF to first training input data and second training input data, thereby generating training output data, wherein the first training input data is based on the first lesion area, and wherein the second training input data is based on the second lesion area.

The relation between the first training input data, the lesion area and the first medical training image is equivalent to the relation between the first input data, the first lesion area and the first medical image described with respect to the method for classifying a lesion. The relation between the second training input data, the second lesion area and the second medical training image is equivalent to the relation between the second input data, the second lesion area and the second medical image described with respect to the method for classifying a lesion.

Furthermore, the trained classifying function can comprise all advantageous features and embodiments as the trained classifying function described with respect to the method of classifying a lesion.

Advantageously, the trained classifying function TCF is a recurrent neural network, and the first training input data and the second training input data are independently used as training input data for the recurrent neural network. Advantageously, the recurrent neural network comprises at least one LSTM block.

Advantageously, the step of applying TAPL-TCF the trained classifying function TCF furthermore comprises the substeps of determining the first training input data by applying a trained preprocessing function TPF to at least a part of the first medical training image containing the first lesion area, and determining the second training input data by applying the trained preprocessing function TPF to at least a part of the second medical training image containing the second lesion area. In particular, the trained preprocessing function is configured by training to classify lesions within single medical images, and/or wherein the trained preprocessing function TPF is a convolutional neural network.

In particular, the trained preprocessing function TPF can be pretrained based on a comparison between training classifications of lesions within a single medical image, and the result of its application to these single medical images.

A further step of the displayed embodiment of the method for providing a trained classifying function is adjusting TADJ-TCF at least one parameter of the trained classifying function TCF based on a comparison of the training classification and the training output data. In particular, the parameter is adapted by minimizing a cost function, wherein the training classification and the trained output parameter are used as input values for the cost function. In particular, the cost function has a (local or global) extremum if the training classification equals the training output data. In particular, adjusting TADJ-TCF at least one parameter of the trained classifying function TCF can comprise a gradient descent algorithm and/or a backpropagation algorithm.

The last step of the displayed embodiment is providing TPROV-TCF the trained classifying function TCF. In particular, providing TPROV-TCF the trained classifying function TCF can comprise displaying, storing and/or transmitting the trained classifying function TCF.

Figure 9:
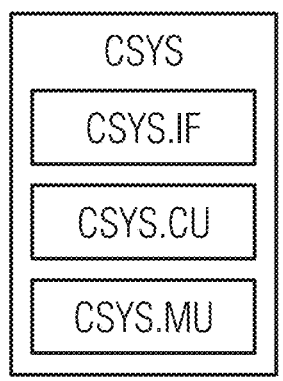
Figure 10:
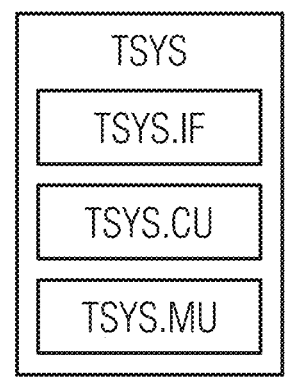

FIG. 9 displays a classification system CSYS, FIG. 10 displays a training system TSYS. The classification system CSYS comprises an interface CSYS.IF, a computation unit CSYS.CU, and a memory unit CSYS.MU. The training system TSYS comprises an interface TSYS.IF, a computation unit TSYS.CU, and a memory unit TSYS.MU.

The classification system CSYS and/or the training system TSYS can be a (personal) computer, a workstation, a virtual machine running on host hardware, a microcontroller, or an integrated circuit. In particular, the classification system CSYS and/or the training system TSYS can be mobile devices, e.g. a smartphone or a tablet. As an alternative, the classification system CSYS and/or the training system TSYS can be a real or a virtual group of computers (the technical term for a real group of computers is "cluster", the technical term for a virtual group of computers is "cloud").

An interface CSYS.IF, TSYS.IF can be embodied as a hardware interface or as a software interface (e.g. PCIBus, USB or Firewire). In general, a computation unit CU.1, CU.2, CU.3 can comprise hardware elements and software elements, for example a microprocessor, a CPU (acronym for "central processing unit"), a GPU (acronym for "graphical processing unit"), a field programmable gate array (an acronym is "FPGA") or an ASIC. (acronym for "application-specific integrated circuit"). The computation unit CSYS.CU, TSYS.CU can be configured for multithreading, i.e. the calculation unit CSYS.CU, TSYS.CU can host different calculation processes at the same time, executing the either in parallel or switching between active and passive calculation processes. A memory unit CSYS.MU, TSYS.MU can be e.g. nonpermanent main memory (e.g. random access memory) or permanent mass storage (e.g. hard disk, USB stick, SD card, solid state disk).

An interface CSYS.IF, TSYS.IF can comprise several (potentially spatially) separate sub-interfaces, each having the characteristics of an interface described above. A computation unit CSYS.CU, TSYS.CU can comprise several (potentially spatially) separate computation sub-units, each having the characteristics of a computation unit described above. A memory unit CSYS.MU, TSYS.MU can comprise several (potentially spatially) separate memory sub-units, each having the characteristics of a memory unit described above.

The classification system CSYS is configured to executed one of the embodiments of the method for classifying a lesion. In particular, the classification CSYS is configured to execute this method by the interface CSYS.IF and the computation unit CSYS.CU being configured to execute the respective steps of the method. The training system TSYS is configured to execute one of the embodiments of the method for providing a trained classifying function TCF. In particular, the training system TSYS is configured to execute this method by the interface TSYS.IF and the computation unit TSYS.CU being configured to execute the respective steps of the method.

Wherever not already described explicitly, individual embodiments, or their individual aspects and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

Finally, it should again be noted that the devices and methods described above in detail are merely example embodiments which can be modified by a person skilled in the art in a wide variety of ways without departing from the scope of the invention. Furthermore, the use of the indefinite article "a" or "an" does not preclude the possibility that the relevant features can also be present plurally. Similarly, the expression "unit" does not preclude this including a plurality of components which can possibly also be spatially distributed.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for classifying a lesion, the computer-implemented method comprising:
   receiving a first medical image of an examination volume, the first medical image corresponding to a first examination time;
   receiving a second medical image of the examination volume, the second medical image corresponding to a second examination time, different from the first examination time;

determining a first lesion area corresponding to a lesion within the first medical image;

determining a registration function based on a comparison of the first medical image and the second medical image;

determining a second lesion area within the second medical image based on the registration function and the first lesion area;

applying a trained classifying function to first input data and second input data, to generate output data, the first input data being based on the first lesion area and the second input data being based on the second lesion area, wherein the trained classifying function is a recurrent neural network, the first input data and the second input data are independently used as input data for the recurrent neural network, information from applying the recurrent neural network to the second input data is stored within a hidden state and is used as additional information when applying the recurrent neural network to the first input data, and the output data of the recurrent neural network depends on the hidden state; and determining a lesion classification based on the output data.

2. The computer-implemented method of claim 1, wherein the recurrent neural network includes at least one LSTM block.

3. The computer-implemented method of claim 1, further comprising:

determining the first input data by applying a trained preprocessing function to at least a part of the first medical image containing the first lesion area, and determining the second input data by applying the trained preprocessing function to at least a part of the second medical image containing the second lesion area.

4. The computer-implemented method of claim 3, wherein the trained preprocessing function is configured by training to classify lesions within single medical images.

5. The computer-implemented method of claim 1, wherein the registration function is a non-rigid registration function.

6. The computer-implemented method of claim 5, wherein the determining of the registration function is based on a vector momentum-parameterized stationary velocity field.

7. The computer-implemented method of claim 1, wherein the first medical image and the second medical image are two-dimensional or three-dimensional X-ray based medical images.

8. A computer-implemented method for providing a trained classifying function, the computer-implemented method comprising:

receiving a first medical training image of a training examination volume, the first medical training image corresponding to a first examination time;

receiving a second medical training image of the training examination volume, the second medical training image corresponding to a second examination time, different from the first examination time;

determining a first lesion area corresponding to a lesion within the first medical training image;

determining a registration function based on a comparison of the first medical training image and the second medical training image;

receiving a training classification corresponding to a first lesion area within the first medical training image;

determining a second lesion area within the second medical training image, based on the registration function and the first medical training image;

applying a trained classifying function to first training input data and second training input data, to generate training output data, the first training input data being based on the first lesion area and the second training input data being based on the second lesion area, wherein the trained classifying function is a recurrent neural network, the first training input data and the second training input data are independently used as input data for the recurrent neural network, information from applying the recurrent neural network to the second training input data is stored within a hidden state and is used as additional information when applying the recurrent neural network to the first training input data, and the training output data of the recurrent neural network depends on the hidden state;

adjusting at least one parameter of the trained classifying function based on a comparison of the training classification and the training output data; and providing the trained classifying function.

9. A classification system for classifying a lesion, the classification system comprising:

an interface configured to receive a first medical image of an examination volume, the first medical image corresponding to a first examination time, receive a second medical image of the examination volume, the second medical image corresponding to a second examination time, different from the first examination time; and at least one processor configured to determine a first lesion area corresponding to a lesion within the first medical image, determine a registration function based on a comparison of the first medical image and the second medical image, determine a second lesion area within the second medical image based on the registration function and the first lesion area, apply a trained classifying function to first input data and second input data, to generate output data, the first input data being based on the first lesion area and the second input data being based on the second lesion area, wherein the trained classifying function is a recurrent neural network, the first input data and the second input data are independently used as input data for the recurrent neural network, information from applying the recurrent neural network to the second input data is stored within a hidden state and is used as additional information when applying the recurrent neural network to the first input data, and the output data of the recurrent neural network depends on the hidden state, and determining a lesion classification based on the output data.

10. A medical imaging system, comprising:

the classification system of claim 9.

11. A non-transitory computer program product storing instructions which, when executed by a classification system, cause the classification system to carry out the computer-implemented method of claim 1.

12. A non-transitory computer-readable medium storing instructions which, when executed by a classification system, cause the classification system to carry out the computer-implemented method of claim 1.

13. A non-transitory computer-readable storage medium, storing a trained classifying function provided by the computer-implemented method according to claim 8, for use in a method for classifying a lesion upon execution by at least one processor.

14. A non-transitory computer-readable medium storing instructions which, when executed by at least one processor, cause the at least one processor to carry out the computer-implemented method of claim 7.

* * * * *